United States Patent
Lu et al.

(10) Patent No.: US 11,755,115 B2
(45) Date of Patent: Sep. 12, 2023

(54) SIMULATED USER INTERFACE IN MIXED REALITY FOR HAPTIC EFFECT MANAGEMENT

(71) Applicant: International Business Machines Corporation, Armonk, NY (US)

(72) Inventors: Fang Lu, Billerica, MA (US); Jeremy R. Fox, Georgetown, TX (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/544,309

(22) Filed: Dec. 7, 2021

(65) Prior Publication Data

US 2023/0176650 A1 Jun. 8, 2023

(51) Int. Cl.
| | |
|---|---|
| *G06F 3/01* | (2006.01) |
| *G06T 19/00* | (2011.01) |
| *G06F 3/0482* | (2013.01) |
| *G06T 19/20* | (2011.01) |
| *G06F 3/04815* | (2022.01) |

(52) U.S. Cl.
CPC ............... *G06F 3/016* (2013.01); *G06F 3/011* (2013.01); *G06F 3/0482* (2013.01); *G06F 3/04815* (2013.01); *G06T 19/006* (2013.01); *G06T 19/20* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 10,327,989 B2 | 6/2019 | Fangrow | |
| 10,754,417 B2 | 8/2020 | Harvey | |
| 2014/0089792 A1 | 3/2014 | Ramsay | |
| 2016/0085303 A1* | 3/2016 | Israr | H04N 21/485 340/407.2 |
| 2016/0098084 A1* | 4/2016 | Hwang | G06F 1/1626 345/173 |
| 2017/0291493 A1 | 10/2017 | Bostick | |
| 2020/0142484 A1 | 5/2020 | Maalouf | |
| 2020/0201437 A1* | 6/2020 | Saboune | G06F 3/04883 |

(Continued)

FOREIGN PATENT DOCUMENTS

EP 35491271 A 10/2019

OTHER PUBLICATIONS

"User Calibration of Haptics Technology,", An IP.com Prior Art Database Technical DisclosureIP.com No. IPCOM000215501D, IP.com Electronic Publication Date: Mar. 2, 2012, 2 pages.

(Continued)

*Primary Examiner* — Roland J Casillas
(74) *Attorney, Agent, or Firm* — Gavin Giraud (57) ABSTRACT

Embodiments disclosed herein include a method for managing haptic effects. The method generates a first graphical representation of a first haptic effect generation pattern in a mixed reality environment, wherein the first haptic effect generation pattern comprises factors for generating a first haptic effect at a first haptic device. The method receives a user alteration to the first haptic effect generation pattern from a first user. The method changes the graphical representation based on the user alteration.

20 Claims, 4 Drawing Sheets

(56) References Cited

U.S. PATENT DOCUMENTS

2021/0018977 A1\* 1/2021 Baumbach .............. G06F 3/012

OTHER PUBLICATIONS

Chauvelin et al., "Characterization of Generic and Personalized On-Screen Vibrotactile Patterns," Proceedings of the 2014 Sixth International Conference on Intelligent Human-Machine Systems and Cybernetics, Aug. 26-27, 2014, Hangzhou, Zhejiang, China, pp. 144-147.

Umair et al., "Exploring Personalized Vibrotactile and Thermal Patterns for Affect Regulation," Designing Interactive Systems Conference 2021 (DIS '21), Jun. 28-Jul. 2, 2021, Virtual Event, USA. ACM, New York, NY, USA, 16 pages, <https://doi.org/10.1145/3461778.3462042>.

\* cited by examiner

SIMULATED USER INTERFACE IN MIXED
REALITY FOR HAPTIC EFFECT
MANAGEMENT

BACKGROUND OF THE INVENTION

The present invention relates generally to the field of haptic feedback, and more particularly to customizing haptic feedback using a mixed reality interface.

Haptic effects are mechanical conditions created by a device to notify a user that is in contact with the device. Haptic effects may include feedback technologies such as force, vibrotactile, electrotactile, ultrasound and thermal conditions. These technologies can be used to create virtual objects in a computer simulation, to control virtual objects, and to enhance remote control of machines and devices (telerobotics). Haptic devices may incorporate tactile sensors that measure forces exerted by the user on the interface. The haptic effect can be generated by a smartwatch, mobile device, head mounted device, display surface of machine, vehicle, etc.

Mixed Reality is a blend of the physical world with digital additions overlaid in a mixed reality display. The mixed reality environment unlocks natural and intuitive 3D human, computer, and environment interactions. Mixed reality takes advantage of advancements in computer vision, graphical processing, display technologies, input systems, and cloud computing. Since the term was first introduced in the mid-1990s, the application of mixed reality has gone beyond displays to include: environmental understanding, including spatial mapping and anchors; human understanding; spatial sound; locations and positioning in both physical and virtual spaces; and collaboration on 3D assets in mixed reality spaces.

SUMMARY

Aspects of an embodiment of the present invention disclose a method, computer program product, and computing system for managing haptic effects. The embodiments include generating a first graphical representation of a first haptic effect generation pattern in a mixed reality environment, receiving a user alteration to the first haptic effect generation pattern from a first user, and changing the graphical representation based on the user alteration.

DETAILED DESCRIPTION

Providing a notification to a user can be very specific to the user and the specific device being used by the user. Further, problems can arise when there are different user preferences, different devices, and different events that require a notification. It can be difficult to abstract the various notifications for delivery and output. Even further, there can be situations where an audio notification or a visual notification is not useful to the user.

Embodiments disclosed herein recognize that a haptic effect can be an effective way to notify users. For certain situations and conditions, users might have preferences on how the haptic effects are delivered. Specifically, a user may want to customize the haptic effect based on various scenarios. Embodiments disclosed herein, therefore, include a mixed-reality-based user interface by which a system can simulate various contextual situations within a mixed reality environment, and accordingly configure haptic effects that are initiated by participating haptic devices. With the mixed reality user interface, the duration of haptic, types of haptic, propagation distance and propagation path of haptic are selected, and accordingly the participating haptic devices may identify the haptic devices that can generate the desired haptic effects.

Figure 1:
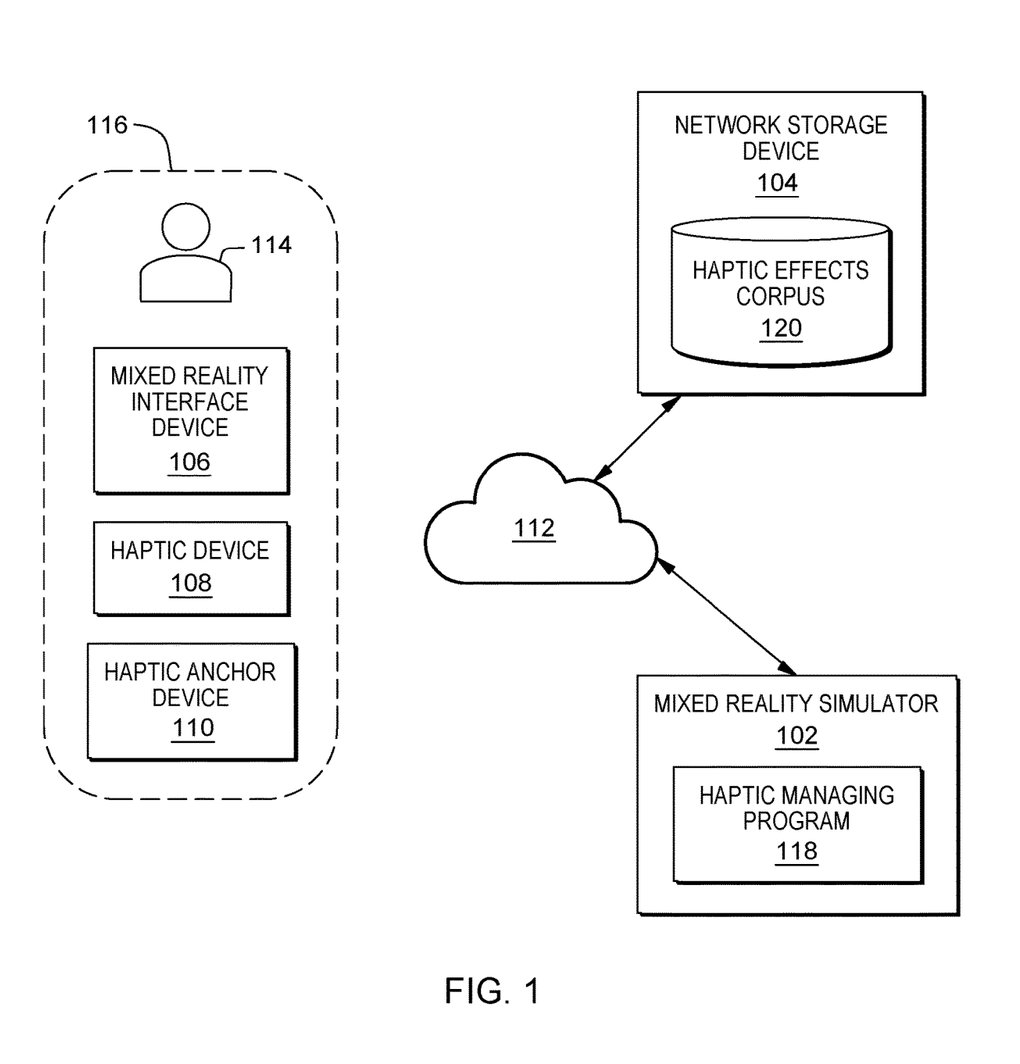
FIG. 1 depicts a schematic block diagram of a haptic managing system in accordance with one embodiment of the present invention.

Turning now to the drawings, FIG. 1 depicts a diagram of a haptic managing system 100 in accordance with one embodiment of the present invention. FIG. 1 provides only an illustration of one embodiment and does not imply any limitations with regard to the environments in which different embodiments may be implemented.

The haptic managing system 100 includes a mixed reality simulator 102, a network storage device 104 (e.g., server, database, filesystem), a mixed reality interface device 106, a haptic device 108, and a haptic anchor device 110, which are communicatively coupled via a communication network 112. The communication network 112 may be a single machine, a local area network (LAN), a wide area network (WAN) such as the Internet, any combination thereof, or any combination of connections and protocols that will support communications between the mixed reality simulator 102, the network storage device 104, the mixed reality interface device 106, the haptic device 108, and the haptic anchor device 110 in accordance with embodiments of the invention. The communication network 110 may include wired, wireless, or fiber optic connections. In certain embodiments, the mixed reality simulator 102, the network storage device 104, the mixed reality interface device 106, the haptic device 108, and the haptic anchor device 110 may communicate without requiring the communication network 110, instead communicating via one or more dedicated wire connections or other forms of wired and wireless electronic communication.

In various embodiments, the mixed reality simulator 102 is a computing device that can be a standalone device, a server, a laptop computer, a tablet computer, a netbook computer, a personal computer (PC), or a desktop computer. In another embodiment, the mixed reality simulator 102 represents a computing system utilizing clustered computers and components to act as a single pool of seamless resources. In general, the mixed reality simulator 102 can be any computing device or a combination of devices with access to the communication network 110. The mixed reality simulator 102 may include internal and external hardware components, as depicted and described in further detail with respect to FIG. 4.

The haptic managing system 100 operates to simulate the activities of a user 114 located within an activity surrounding 116, to graphically generate haptic effect generation patterns within the mixed reality environment, and to initiate haptic effects under specified conditions detected within the mixed reality environment. While a single user 114 is illustrated, the haptic managing system 100 may be used to simulate many (e.g., dozens, hundreds) users 114 simultaneously through the communication network 112. The same goes for using multiple instances of the mixed reality interface device 106, the haptic device 108, and the haptic anchor device 110.

The haptic managing system 100 uses a haptic managing program 118 located on the mixed reality simulator 102 to show the user 114 a mixed reality environment through the mixed reality interface device 106. The mixed reality interface device 106 may include a headset, glasses, a smartphone, or other technologies that allow the user 114 to have a field of view that is filled by the mixed reality interface device 106. The mixed reality interface device 106 may also include a camera external from the user 114 so that the user 114 may be shown the activity surrounding 116 while using the mixed reality interface device 106. Furthermore, the mrid 106 may include speakers such as headphones or earphones to digitally add sound to the mixed reality environment.

The haptic managing system 100 utilizes the haptic device 108 to deliver haptic effects that notify the user 114 when specific conditions are satisfied within the mixed reality environment. The conditions are stored as a haptic effect generation pattern, which includes the initiation conditions under which a haptic effect will be initiated, and the form that the haptic effect takes when delivered to the user 114.

For example, the haptic effect generation pattern may include initiation conditions such as a location of haptic effect generation, a life cycle of the haptic effect (e.g., haptic effect only for one day, week, season, etc.), or a distance of propagation in the activity surrounding. The location of haptic effect generation may be stored as a specific digital boundary within the mixed reality environment. When the user 114 and the mrid 106 pass within the boundary, the mixed reality simulator 102 may detect the location of the mrid 106 and initiate the haptic effect at the haptic device 108. The location of haptic effect generation may also be tied to the haptic anchor device 110. In certain embodiments, the boundary is located relative to the haptic anchor device 110, such that a when the haptic anchor device 110 and either the haptic device 108 or the mrid 106 pass within the boundary surrounding the haptic anchor device 110, the haptic effect is initiated by the haptic managing program 118.

The haptic effect propagation path is the lifecycle of the desired haptic effect. For example, some haptic effects will be active only at certain times of the day, or may change depending on various factors such as how many people or devices are present within the activity surrounding 116. Furthermore, the haptic effect propagation path includes the timing out of the haptic effect. Specifically, the haptic effect may be designed to terminate after a set number of days or weeks.

In addition to determining the conditions under which the haptic device 108 will initiate a haptic effect, the haptic effect generation pattern may also include action factors determining the actions the haptic device 108 takes during the haptic effect. When the haptic managing program 118 initiates the haptic effect at the haptic device 108, the haptic device 108 may vibrate, change temperature, push, or electrically stimulate the user 114, among other things. Furthermore, each of these types of haptic feedback may include a customizable duration or periodicity. In addition to single-haptic device feedback, the haptic effect generation pattern may include a combination of multi-haptic devices 108.

The haptic managing program 118 stores the initiation conditions and the action factors of each haptic effect generation pattern in a haptic effects corpus 120 on the network storage device 104. All haptic effect generation patterns are thus accessible to all the devices of the haptic managing system 100. The haptic managing program 118 may also employ a customizable scheme for generating a graphical representation of the haptic effect generation patterns within the mixed reality environment. That is, the haptic managing program 118 may graphically show the boundary with particular characteristics such as shape, color, intensity, saturation, opacity, and others, to represent the haptic effect generation pattern. For example, a haptic effect with a forceful vibration may be represented in the mixed reality environment with a bright or vibrant graphic boundary while a small vibration may be represented in the mixed reality environment with a dull or muted graphic boundary. Furthermore, haptic effects utilizing heat may be represented by a red graphic, with cooling haptic effects represented by a blue graphic. Haptic effect generation patterns that involve cautionary warnings may include flashing in the mixed reality environment.

Figure 2:
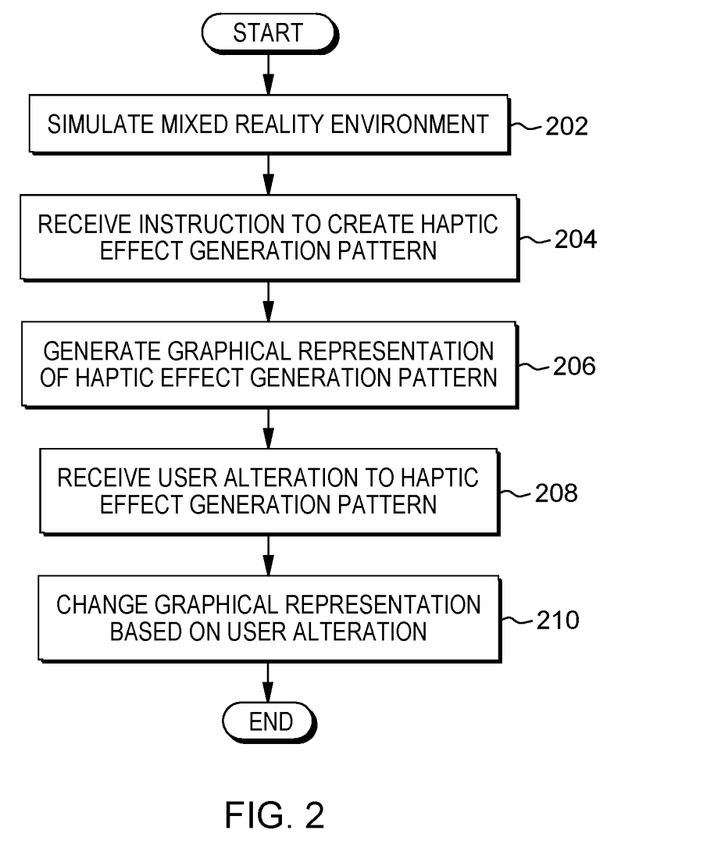
FIG. 2 depicts a flowchart of the steps of a haptic managing program executing within the haptic managing system of FIG. 1, for managing haptic effects in a mixed reality environment, in accordance with one embodiment of the present invention.

The haptic effect generation pattern may be customized by the user 114 using the haptic managing program 118 within the mixed reality environment according to the method illustrated in FIG. 2. FIG. 2 depicts a flowchart of the steps of a haptic managing program 118 executing within the haptic managing system 100 of FIG. 1, in accordance with one embodiment of the present invention. The haptic managing program 118 may simulate a mixed reality environment overlaying an activity surrounding (block 202). The activity surrounding may include a machine shop floor, a retail store, a fabrication room, a manufacturing facility, or other locations where mixed reality may be used. Simulating the mixed reality environment may include tracking locations of mixed reality interface devices, haptic devices, haptic anchor devices, or other real-world objects.

The haptic managing program 118 may also receive instruction to create a haptic effect generation pattern within the mixed reality environment (block 204). The instruction may be received from the user 114. The user 114 may interact with the haptic managing program 118 through input devices such as a keyboard, mouse, controller, etc. such that the user 114 sends the instruction directly to the mixed reality simulator 102. The instruction may also be received automatically based on conditions simulated within the mixed reality environment. For example, when a haptic device 108 is added to the mixed reality environment, when a connection with a haptic device 108 or haptic anchor device 110 changes, or when the mixed reality interface device 106 detects a condition, then the haptic managing program 118 may add an associated haptic effect generation pattern. The added haptic effect generation pattern may be tied to a specific location such that when the user enters a specific location within the mixed reality environment, the haptic effect is triggered. The specific locations within the mixed reality environment may be associated with haptic anchor devices 110, or may be associated with a location that is recognized by the haptic managing program 118. For example, the haptic managing program 118 may recognize an object (e.g., face, machine, barcode, or QR code) that shows up within the view of the camera of the mixed reality interface device 106.

As part of the mixed reality, the haptic managing program 118 may generate a graphical representation of the haptic effect generation pattern (block 206). The graphical representation is generated in the mixed reality environment such that the user 114 may view the graphical representation through the mixed reality interface device 106. The graphical representation enables the user to quickly identify the haptic effects that will result from triggering the haptic effect generation pattern.

The haptic managing program 118 may also receive a user alteration to the haptic effect generation pattern (block 208). The user 114 alters the haptic effect generation pattern based on a desired haptic effect. In certain embodiments, the user 114 may select a haptic effect generation pattern from within the mixed reality environment, and pull up an alteration menu that is visible on the mixed reality interface device 106. The alteration menu may include options to change the size, shape, color, or other display characteristics for how the haptic effect generation pattern appears in the mixed reality environment. The triggering point of the haptic effect generation pattern may also be changed. For example, the user 114 can define the haptic effect propagation path, distance of propagation in the surrounding, location of haptic effect generation, or other location-specific characteristics.

Based on the configuration of the user 114, the haptic managing program 118 may also identify which haptic devices 108 can participate to create required haptic effect. That is, some haptic effects may be configured to use multiple devices to initiate the haptic effect. Based on the result of the simulated mixed reality environment, if the single haptic device 108 is not able to product required level of haptic then the proposed system will recommend installing one or more haptic effects and a damping generation module (the damping model simulates a mixed reality simulation of the decrease in the amplitude of an oscillation as a result of energy being drained from the system to overcome frictional or other resistive forces for said device).

Figure 3:
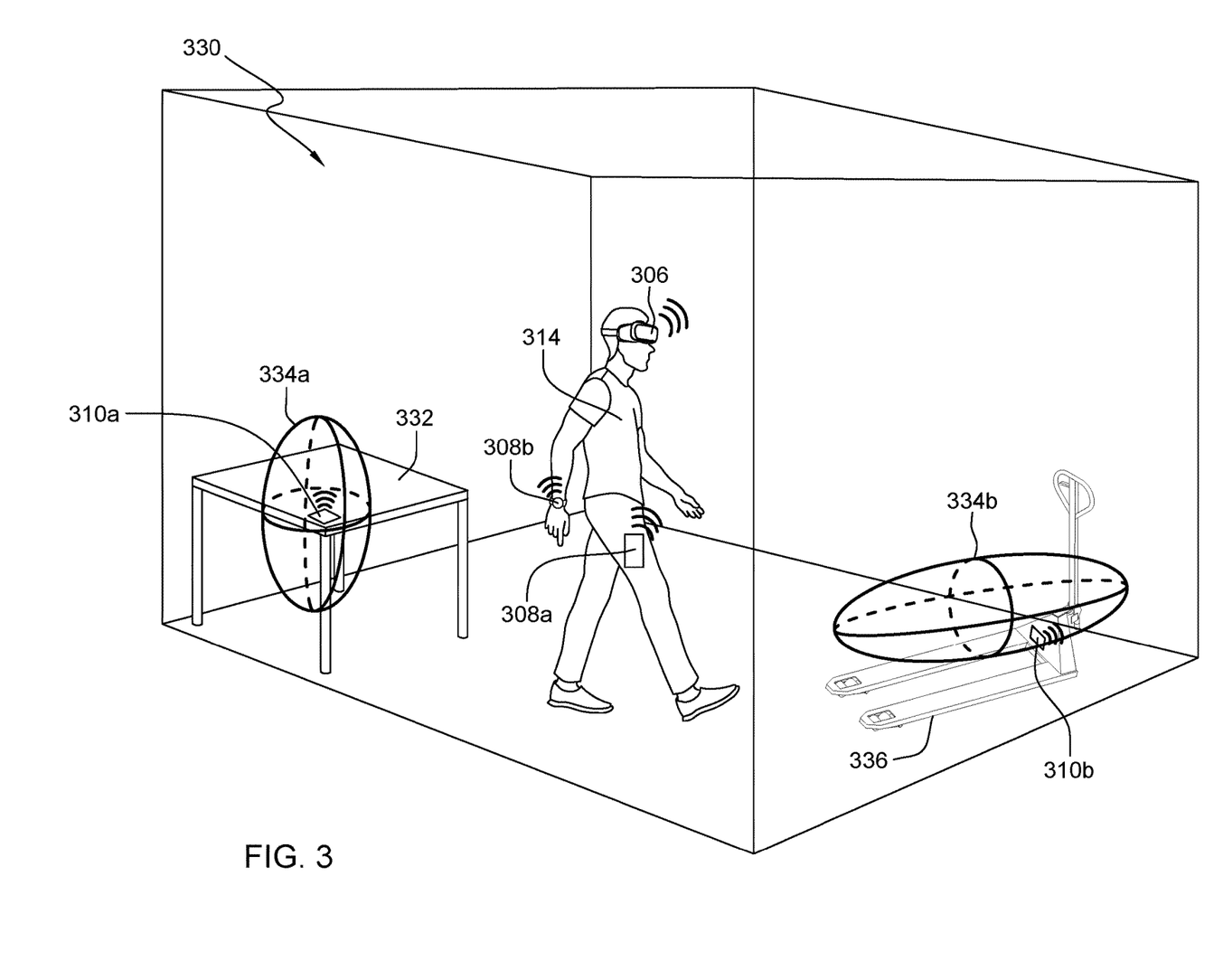
FIG. 3 depicts a schematic representation of a mixed reality environment managed by a mixed reality simulator, in accordance with one embodiment of the present invention.

Based on the user alteration, the haptic managing program 118 may change the graphical representation (block 210). FIG. 3 depicts a schematic diagram of a mixed reality environment 330 in which the haptic managing system 100 may operate to manage haptic effects, in accordance with one embodiment of the present invention. The mixed reality environment 330 may overlay the activity surrounding 116 as simulated by the haptic managing program 118, and may include real objects and digitally overlaid objects or interfaces. A user 314 may wear a mixed reality interface device 306 to view and interface with the mixed reality environment 330, and may wear or carry a smartphone haptic device 308*a* and a watch haptic device 308*b* to receive haptic effects. As described above, the haptic devices 308*a, b* may vibrate, change temperature, push, or electrically stimulate the user 314. Additionally, the smartphone haptic device 308*a* may combine with the watch haptic device 308*b* to provide further customization for haptic effect generation patterns.

The smartphone haptic device 308*a* and the watch haptic device 308*b* may communicate wirelessly (e.g., through the communication network 112) to send and receive signals with the haptic managing program 118. As the haptic managing program 118 simulates the mixed reality environment 330, the user 314 may interact to send an instruction to create a haptic effect generation pattern for a haptic anchor device 310*a* at a fixed structure 332. The haptic managing program 118 may then generate a graphical representation 334*a* of the haptic effect generation pattern within the mixed reality environment 330. The graphical representation 334*a* may include characteristics such as size, shape, color, intensity, saturation, opacity, and others to represent when the haptic effect will be initiated (e.g., when the smartphone haptic device 308*a* enters the boundary), and what the haptic effects will be (e.g., pulsed vibration every 1 second until deactivated by the user 314).

The haptic managing program 118 may also receive instructions to create a haptic effect generation pattern for a mobile haptic anchor device 310*b* attached to a mobile structure 336. The haptic managing program 118 may then generate a graphical representation 334*b* of the haptic effect generation pattern within the mixed reality environment 330. The haptic effects for the mobile haptic anchor device 310*b* may include a higher level of risk, such that the graphical representation 334*b* is more conspicuous, and the haptic effects are more arresting. For example, the haptic effect generation pattern for the mobile haptic anchor device 310*b* may include instructions such that any haptic device 108, 308 that enters the boundary causes all haptic devices 108, 308 to begin vibrating. For such broad-ranging notifications, the haptic managing program 118 may include an opt-in procedure. The opt-in procedure may include a user validation requirement to ensure the profile of the user 314 has approved the haptic effects. Such profiles may provide the haptic managing program 118 with a corpus of knowledge and the tailoring of haptic effects to the user 314 such that when haptic effect generation patterns are created, the user's 314 own defaults are attached.

Figure 4:
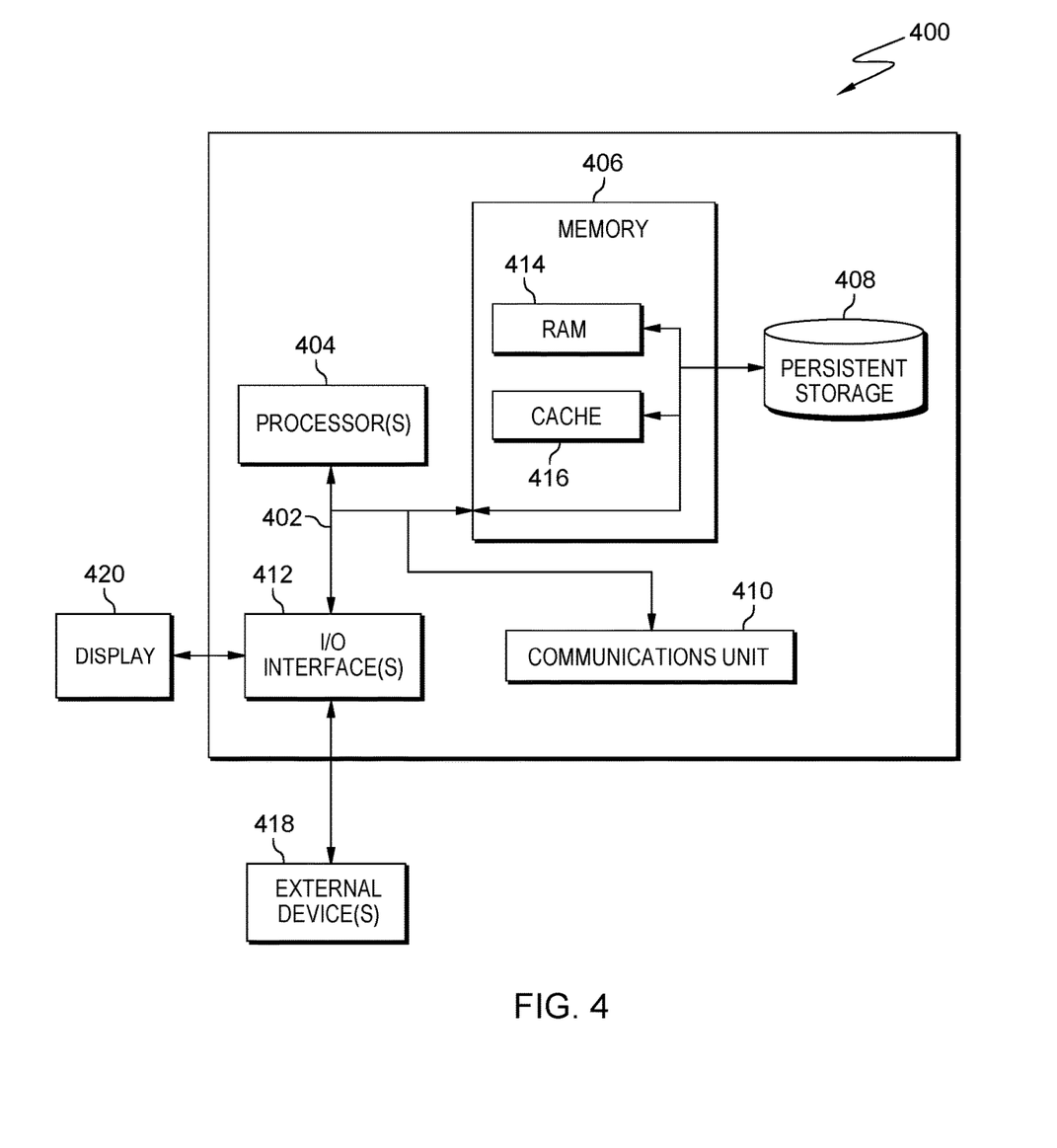
FIG. 4 depicts a block diagram of components of a computing device representing a mixed reality simulator, haptic devices, or haptic location marker devices, in accordance with one embodiment of the present invention.

FIG. 4 depicts a block diagram of components of a computing device 400 that represents any of the devices (e.g., the mixed reality simulator 102, the network storage device 104, the mixed reality interface devices 106, 306, the haptic devices 108, 308*a, b*, and the haptic anchor devices 110, 310*a, b*) in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

The haptic managing program 118 may be stored in persistent storage 408 of computing device 400 for execution by one or more of the respective computer processors 404 of computing device 400 via one or more memories of memory 406 of computing device 400. The proctoring program 120 and the classification algorithm 122 are stored for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. The proctoring program 120 and the classification algorithm 122 may be downloaded to persistent storage 408 of computing device 40 through communications unit 410 of the computing device 400. The proctoring program 120 and the classification algorithm 122 may be downloaded to persistent storage 408 of the computing device 400 through communications unit 410.

I/O interface(s) 412 allows for input and output of data with other devices that may be connected to the computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., haptic program 120, can be stored on such portable computer-readable storage media and can be loaded onto persistent storage 408 of the computing device 400 via I/O interface(s) 412 of the computing device 400. Software and data used to practice embodiments of the present invention, e.g., the proctoring program 120 and the classification algorithm 122, can be stored on such portable computer-readable storage media and can be loaded onto persistent storage via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing haptic effects, comprising:
   generating, by one or more processors, a first graphical representation of a first haptic effect generation pattern in a mixed reality environment, wherein the first haptic effect generation pattern comprises factors for generating a first haptic effect at a first haptic device, and the first graphical representation comprises a characteristic representing the first haptic effect;
   receiving, by one or more processors, a user alteration to the first haptic effect generation pattern from a first user viewing the mixed reality environment, wherein the user alteration comprises a change by the first user to the characteristic representing the first haptic effect;
   changing, by one or more processors, the characteristic of the graphical representation and the first haptic effect based on the user alteration; and
   sending the first haptic effect to the first haptic device worn by a second user not viewing the mixed reality environment.

2. The method of claim 1, wherein the factors of the first haptic effect generation pattern are selected from the group consisting of: a duration of the haptic effect, a type of haptic feedback, a multi-device haptic feedback, a single-device haptic feedback, a user ID, a life cycle of the first haptic effect, a distance of propagation in the activity surrounding, and a location of haptic effect generation.

3. The method of claim 1, further comprising identifying additional haptic devices that can produce the first haptic effect generation pattern.

4. The method of claim 1, initiating the first haptic effect at the first haptic device based on the first haptic effect generation pattern.

5. The method of claim 4, further comprising initiating a second haptic effect at a second haptic device operating in the mixed reality environment based on a similarity between the first haptic device and the second haptic device.

6. The method of claim 1, further comprising simulating the mixed reality environment as an overlay of an activity surrounding, wherein the activity surrounding comprises a selection from the group consisting of: a machine shop floor, a retail store, a fabrication room, and a manufacturing facility.

7. The method of claim 1, further comprising:
   determining a location of the first haptic device; and
   automatically altering the first haptic effect based on a proximity of the first haptic device to a mobile haptic anchor device.

8. The method of claim 1, wherein the user alteration comprises a signal generated by an action of the first user recognized within the mixed reality environment.

9. The method of claim 1, further comprising generating a second graphical representation of the first haptic effect generation pattern that is different than the first graphical representation, wherein the first graphical representation is generated for a first user ID and the second graphical representation is generated for a second user ID.

10. A computer program product for managing haptic effects in a mixed reality environment, the computer program product comprising:
    one or more computer-readable storage media and program instructions collectively stored on the one or more computer-readable storage media, the program instructions comprising:
    program instructions to generate a first graphical representation of a first haptic effect generation pattern in a mixed reality environment, wherein the first haptic effect generation pattern comprises factors for generating a first haptic effect at a first haptic device, and the first graphical representation comprises a characteristic representing the first haptic effect;

program instructions to receive a user alteration to the first haptic effect generation pattern from a first user viewing the mixed reality environment, wherein the user alteration comprises a change by the first user to the characteristic representing the first haptic effect;

program instructions to change the characteristics of the graphical representation and the first haptic effect based on the user alteration; and program instruction to send the first haptic effect to the first haptic device worn by a second user not viewing the mixed reality environment.

11. The computer program product of claim 10, wherein the first haptic effect generation pattern comprises factors selected from the group consisting of: a duration of haptic, a type of haptic feedback, a multi-device haptic feedback, a single-device haptic feedback, a user ID, a life cycle of the first haptic effect, a distance of propagation in the activity surrounding, and a location of haptic effect generation.

12. The computer program product of claim 10, further comprising program instructions to initiate the first haptic effect at the first haptic device based on the first haptic effect generation pattern.

13. The computer program product of claim 12, further comprising program instructions to initiate a second haptic effect at a second haptic device operating in the mixed reality environment based on a similarity between the first haptic device and the second haptic device.

14. The computer program product of claim 10, further comprising:

program instructions to determine a location of the first haptic device; and program instructions to automatically alter the first haptic effect based on a proximity of the first haptic device to a mobile haptic anchor device.

15. The computer program product of claim 10, further comprising program instructions to generate a second graphical representation of the first haptic effect generation pattern that is different than the first graphical representation, wherein the first graphical representation is generated for a first user ID and the second graphical representation is generated for a second user ID.

16. A computer system for managing haptic effects, the computer system comprising:

one or more computer processors, one or more computer-readable storage media, and program instructions stored on the computer-readable storage media for execution by at least one of the one or more computer processors, the program instructions comprising:

program instructions to generate a first graphical representation of a first haptic effect generation pattern in a mixed reality environment, wherein the first haptic effect generation pattern comprises factors for generating a first haptic effect at a haptic device, and the first graphical representation comprises a characteristic representing the first haptic effect;

program instructions to receive a user alteration to the first haptic effect generation pattern from a first user viewing the mixed reality environment, wherein the user alteration comprises a change by the first user to the characteristic representing the first haptic effect;

program instructions to change the characteristics of the graphical representation and the first haptic effect based on the user alteration; and program instructions to send the first haptic effect to the first haptic device worn by a second user not viewing the mixed reality environment.

17. The computer system of claim 16, further comprising program instructions to initiate the first haptic effect at the first haptic device based on the first haptic effect generation pattern.

18. The computer system of claim 17, further comprising program instructions to initiate a second haptic effect at a second haptic device operating in the mixed reality environment based on a similarity between the first haptic device and the second haptic device.

19. The computer system of claim 16, further comprising:

program instructions to determine a location of the first haptic device; and program instructions to automatically alter the first haptic effect based on a proximity of the first haptic device to a mobile haptic anchor device.

20. The computer system of claim 16, further comprising program instructions to generate a second graphical representation of the first haptic effect generation pattern that is different than the first graphical representation, wherein the first graphical representation is generated for a first user ID and the second graphical representation is generated for a second user ID.

* * * * *